United States Patent
Danielewicz et al.

(10) Patent No.: US 8,628,095 B2
(45) Date of Patent: Jan. 14, 2014

(54) GASKET FOR A PRESSURIZED FLUID INTERFACE

(75) Inventors: Curt R. Danielewicz, Macomb, MI (US); Manmeet S. Pannu, Sterling Heights, MI (US); James B. Hicks, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 623 days.

(21) Appl. No.: 12/849,444

(22) Filed: Aug. 3, 2010

(65) Prior Publication Data

US 2011/0278839 A1 Nov. 17, 2011

Related U.S. Application Data

(60) Provisional application No. 61/345,401, filed on May 17, 2010.

(51) Int. Cl.
*F16J 15/02* (2006.01)
(52) U.S. Cl.
USPC .......................................... 277/644; 277/630
(58) Field of Classification Search
USPC .................. 277/608, 628, 630, 639, 640, 644
See application file for complete search history.

(56) References Cited

U.S. PATENT DOCUMENTS

| 5,716,051 | A | * | 2/1998 | Cornea et al. | 277/609 |
| 6,981,704 | B2 | * | 1/2006 | Okazaki et al. | 277/638 |
| 7,252,293 | B2 | * | 8/2007 | Happel | 277/624 |
| 2009/0206558 | A1 | * | 8/2009 | Nameki | 277/644 |
| 2010/0084827 | A1 | * | 4/2010 | Peddle | 277/644 |

FOREIGN PATENT DOCUMENTS

| JP | 57132855 U | 8/1982 |
| JP | 2007255671 A | * 10/2007 |

* cited by examiner

*Primary Examiner* — Gilbert Lee
(74) *Attorney, Agent, or Firm* — Quinn Law Group, PLLC

(57) ABSTRACT

A gasket loop includes a gasket shape with a first portion characterized by a cross-sectional view. The first portion in the cross-sectional view includes a substantially elongated body characterized by a height, a first end characterized by a height, a tip, a width enlarged relative to the body, and a tapered backside. The tapered backside is integral with the body. The first portion in the cross-sectional view additionally includes a distal second end connected to the body. A fluid-pressure joint assembly and a method of sealing such a joint via the gasket loop are also disclosed.

17 Claims, 3 Drawing Sheets

FIG. 1
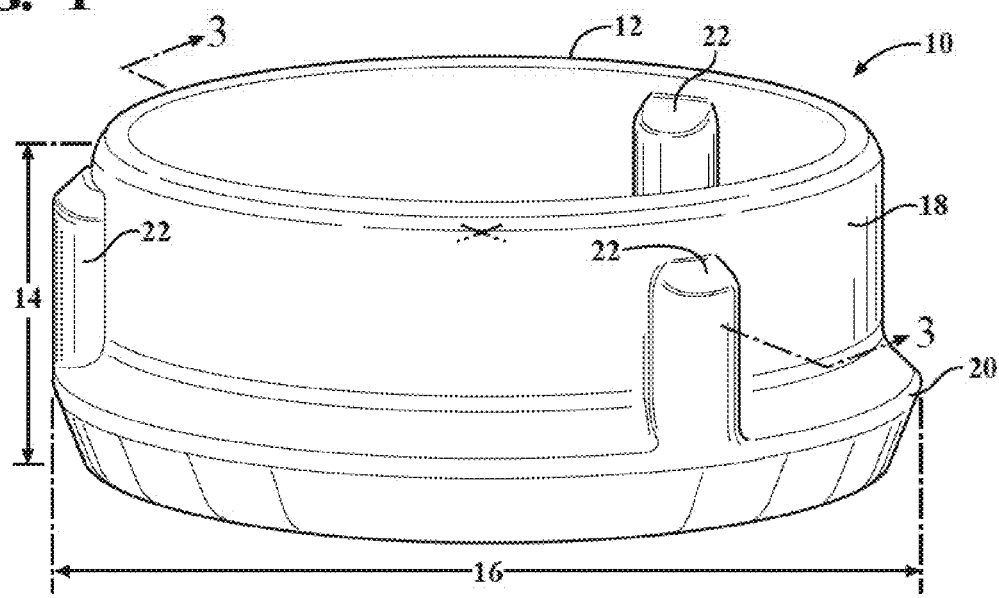
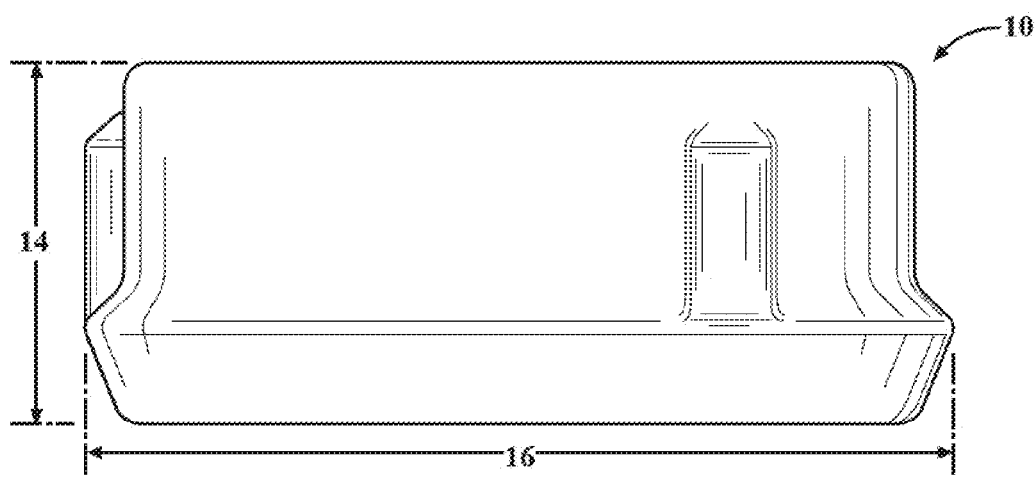
FIG. 2

GASKET FOR A PRESSURIZED FLUID INTERFACE

CROSS-REFERENCE TO RELATED APPLICATION(S)

This application claims the benefit of U.S. Provisional Application Ser. No. 61/345,401 filed May 17, 2010, the entire contents of which is hereby incorporated by reference.

TECHNICAL FIELD

The invention relates to a gasket for a pressurized fluid interface.

BACKGROUND

A gasket is a mechanical seal that fills the space between mating surfaces, generally to prevent leakage of a fluid from or into the joined objects while the gasket is under compression. Gaskets permit "less-than-perfect" mating surfaces on machine parts to be joined without allowing leakage by using the gasket to fill surface irregularities. Gaskets are commonly produced from sheet or molded materials such as paper, natural rubber, synthetic rubber, metal, or a plastic polymer. Some gaskets require an application of sealant directly to the gasket surface to function properly.

In situations where a joint between two mating components is pressurized, sealing of such a joint becomes even more challenging. Additionally, in such pressurized joints, any unintended fluid leakage may lead to functional failure of a system thus being sealed. Typically, such leakage may cause additional inconvenience by creating a fluid spill that necessitates a clean-up. Design and selection of a gasket for a particular application may thus prove critical to the reliability of a subject system and to the satisfaction of the system's user.

SUMMARY

A gasket loop includes a gasket shape with a first portion characterized by a cross-sectional view. The first portion in the cross-sectional view includes a substantially elongated body characterized by a width and a height, a first end characterized by a height, a tip, a width enlarged relative to the width of the body, and a tapered backside. The tapered backside is integral with the body. The first portion in the cross-sectional view additionally includes a distal second end connected to the body.

The tip of the first portion in the cross-sectional view may be tapered, and the distal second end of the first portion in the cross-sectional view may be substantially spherical. The gasket may be formed from a compliant material. The gasket may be configured to come into contact with a fluid, and the material may therefore be selected based on its chemical resistance to the fluid. The predetermined gasket profile may be configured as multiple interconnected O-rings.

The gasket loop may include a discrete number of second portions positioned around the gasket shape, and each discrete second portion is characterized by a cross-sectional view, the second portion in the cross-sectional view having a tip and a height substantially matching those of the first end. Each discrete second portion may be additionally characterized by a body that is characterized by a width that is substantially equivalent to the width of the first end of first portion.

A fluid-pressure joint assembly and a method of sealing such a joint via the gasket loop are also disclosed.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 1 is a perspective view of a gasket for use in sealing a fluid-pressure joint;

FIG. 2 is a schematic side view of the gasket shown in FIG. 1;

DETAILED DESCRIPTION

Figure 3:
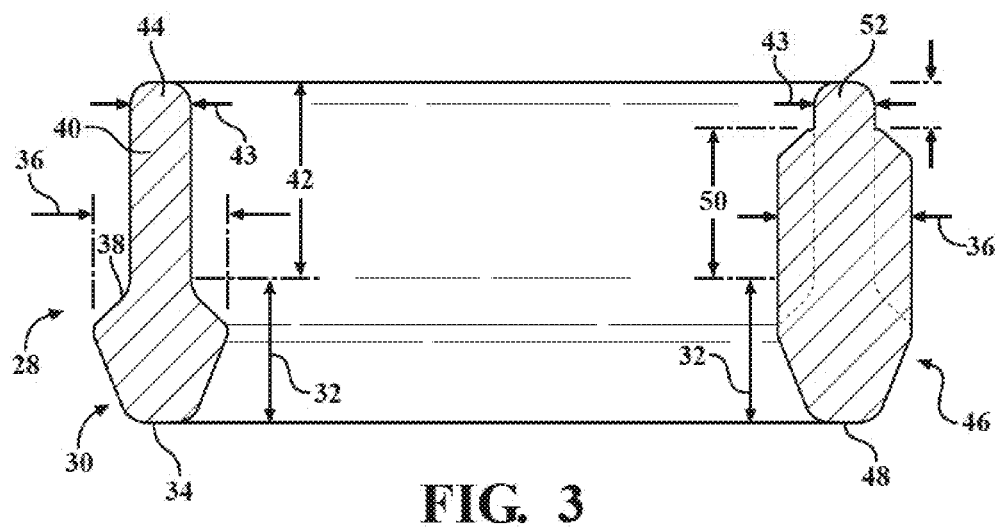
FIG. 3 is a schematic cross-sectional view of the gasket shown in FIGS. 1 and 2.

Referring to the drawings, wherein like reference numbers refer to like components, FIG. 1 shows a schematic perspective view and FIG. 2 shows a schematic side view of a gasket loop 10. Gasket loop 10 is adapted to be inserted into an appropriate channel of a receiving component for sealing a fluid-pressure joint, and especially for sealing when such a joint has a large gap variation. Typically, a joint is said to have a large gap variation when design and/or manufacturing tolerances of the mating components become a significant percentage of the thickness of the employed gasket. In such a situation, under maximum material condition of the mating components, i.e., when such components are to their maximum allowable size, the actual compression of the gasket in the assembled joint may exceed approximately 20-35% of its thickness, and lead to excessive stress on those components. On the other hand, in such a situation under a minimum material condition of the mating components, i.e., when such components are to their minimum allowable size, sealing pressure on the gasket may be too low to retain pressurized fluid without leakage, which may lead to various functional concerns.

As shown in FIGS. 1 and 2, gasket loop 10 has a predetermined, generally uniform O-ring contour or shape 12 that is characterized by an overall height 14 and a diameter 16. Gasket loop 10 includes a substantially uniform wall 18 integrally connected with an enlarged portion 20. Gasket loop 10 additionally includes three sections 22 that are formed with the wall 18, and extend inward toward the center of the O-ring shape 12, as well as outward from the O-ring shape. Sections 22 are formed to flow seamlessly into the enlarged portion 20. FIG. 3 shows a cross-sectional view of gasket loop 10, wherein the direction of the cross-sectional view is denoted by arrows 3 in FIG. 1. Arrow 33 cuts through the wall 18 to expose a first portion 28. First portion 28 includes a first end 30 characterized by a height 32, a substantially spherical tip 34, a width 36, and a tapered backside 38. First portion 28 additionally includes a substantially uniform elongated body 40 characterized by a height 42 and a width 43, such that width 36 is enlarged relative to width 43. The body 40 is integral with the tapered backside 38. First portion 28 additionally includes a substantially spherical distal second end 44. Tip 34 and second end 44 have a substantially spherical shape such that each may enjoy effective contact with surfaces of the mating components during the sealing of the fluid-pressure joint.

Arrow 33 also cuts through section 22 and exposes a second portion 46. Second portion 46 includes a substantially spherical tapered tip 48 that substantially matches the tip 34. Second portion 46 additionally includes a substantially uniform body 48 that is characterized by a height 50, and is also characterized by a width 36, i.e., same as the width of first end 30. Second portion 46 also includes a narrow portion 52 that is characterized by width 43, i.e., same as the width of body 40. As such, second portion 46 is devoid of a tapered backside that characterizes first portion 28, such that body 48 may serve to affect an interference fit with a mating component when the gasket loop 10 is assembled therewith. Tip 48 and narrow portion 52 have substantially spherical end-shapes substantially matching those of tip 34 and second end 44.

Figure 4:
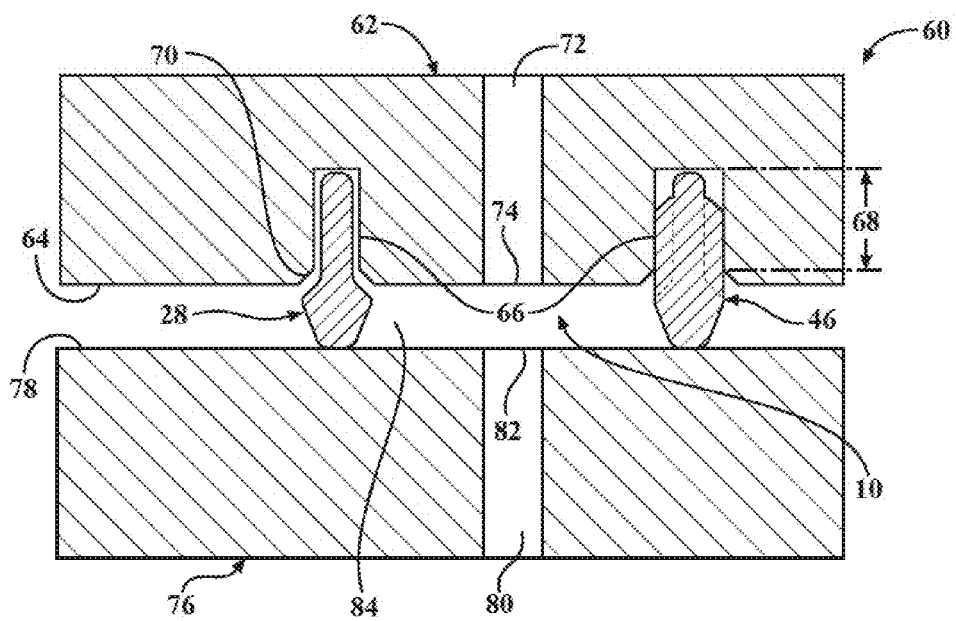
FIG. 4 is a schematic cross-sectional view of a fluid-pressure joint including the gasket shown in FIG. 2 assembled with a first and second components.

FIG. 4 depicts a cross-sectional view of a fluid-pressure joint 60, including the gasket loop 10 shown in FIGS. 1-3 and described above, as well as a first component 62 and a second component 76. First component 62 includes a first surface 64. A channel loop 66 is arranged on the first surface 64 and is characterized by a profile that complements profile 12 of the gasket loop 10 for accepting the gasket loop during assembly of joint 60. The channel loop 66 is also characterized by a channel height 68. Channel height 68 is smaller than height 42 of gasket loop 10, such that upon assembly of joint 60 the height 42 becomes compressed. Channel loop 66 is additionally characterized by a lead-in chamfer 70 that is configured to complement the tapered backside 38 of gasket loop 10. First component 62 additionally includes a first internal fluid passage 72 having an exit 74 on the first surface 64, such that exit 74 is encircled by the channel loop 66.

Second component 76 includes a second surface 78. Second component 76 also includes a second internal fluid passage 80 having an exit 82 on the second surface 78, such that exit 82 is encircled by the gasket loop 10 when assembly of the fluid-pressure joint 60 is complete. During assembly of the fluid-pressure joint 60 when gasket loop 10 is inserted into channel loop 66, width 36 of the second portion 46 is elastically compressed as a result of an interference fit with the channel loop. Such elastic compression of the width 36 serves to provide reliable retention of the gasket loop inside the channel loop. After the gasket loop 10 is inserted into the channel loop 66, and the first component 62 is assembled with the second component 76, the second surface 78 is disposed substantially parallel to the first surface 64, while leaving a gap 84 between first and second surfaces 64 and 78. Additionally, upon such assembly, the second surface 78 compresses the gasket loop 10 against the first component 62, such that the height 42 of the first portion 28 and the entire second portion 46 are compressed against the channel. Furthermore, upon such assembly, the first end 30 of the first portion 28 is compressed against the lead-in chamfer 70 of the channel loop 66 to thereby seal fluid-pressure joint 60.

Gasket loop 10 is preferably formed from a compliant, spring-like material, such as rubber or silicone. The material for gasket loop 10 is preferably chosen to be chemically resistant to a particular fluid, such as a lubricant or a coolant, that the fluid-pressure joint is intended to come in contact with and/or retain. Although, as shown in FIGS. 1-4, the profile 12 of gasket loop 10 is essentially that of a single O-ring, nothing precludes the gasket loop profile from including any number of interconnected O-rings. Such an interconnected O-ring shape may be formed by any appropriate manufacturing process, so that each constituent O-ring would have first and second portions 28, 46 as shown in FIG. 3 and described above.

Figure 5:
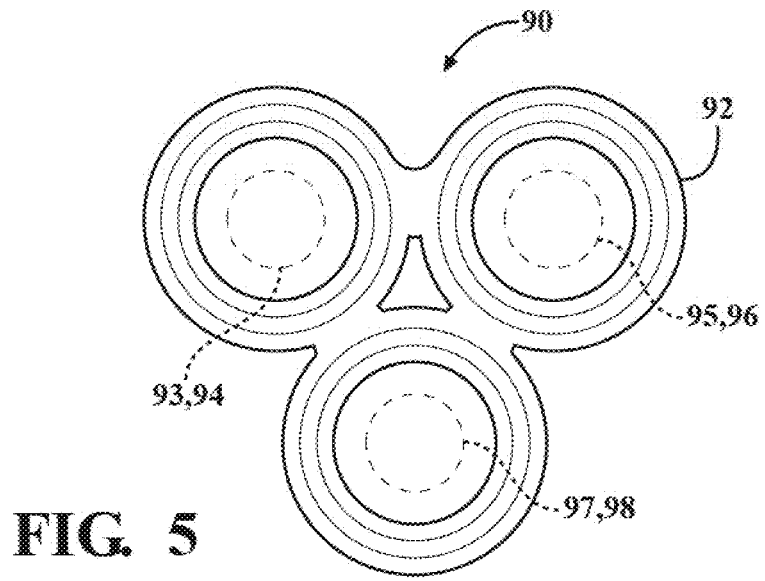
FIG. 5 is a schematic plan view of a gasket having three interconnected O-rings having cross-sections as shown in FIG. 3.

A schematic plan view of a fluid pressure joint 90 including a gasket loop 92 having three interconnected O-rings is shown in FIG. 5. Such construction of gasket loop 92 may be beneficial wherein each of the first and second components 62 and 76 includes three corresponding internal fluid passages that upon assembly of the fluid-pressure joint 90 form three pairs of passages 93 and 94, 95 and 96, and 97 and 98, that are sought to be sealed. Passages 93, 95, and 97 are included in first component 62, and passages 94, 96, and 98 are included in second component 76, as shown schematically in FIG. 4. Each passage 93, 95, and 97 has an exit on the first surface 64, and each passage 94, 96, and 98 has an exit on the second surface 78. Gasket loop 92 is therefore configured such that each exit 93-98 of the multiple internal fluid passages is encircled by one O-ring of the gasket loop. Essentially, because each loop or O-ring is intended to encircle and seal a fluid passage in mating components, the specific number of loops is necessitated by the number of fluid passages that is sought to be sealed. Additionally, nothing precludes the profile from having any other loop shapes, such as that of an oval.

Figure 6:
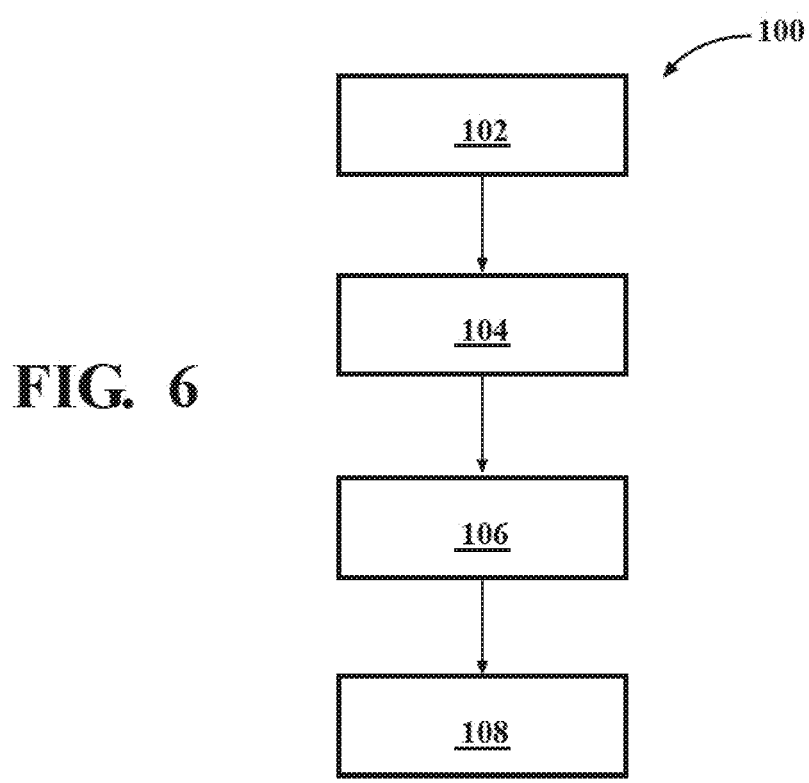
FIG. 6 is a flow chart illustrating a method of sealing a fluid-pressure joint by using the gasket depicted in FIGS. 1 and 2.

A method 100 of sealing fluid-pressure joint 60 by using the gasket loop 10 is shown in FIG. 6, and described below with respect to FIGS. 1-4. The method commences in frame 102, wherein the method includes inserting gasket loop 10 into channel loop 66 of first component 62, such that exit 74 of the first internal fluid passage 72 is encircled by the channel loop. Following the insertion of gasket loop 10 into channel loop 66, the method proceeds to frame 104. In frame 104, the method includes assembling the first component 62, along with the inserted gasket loop 10, with second component 76, such that second surface 78 is disposed substantially parallel to first surface 64, and exit 82 of the second internal fluid passage 80 is encircled by gasket loop 10.

After frame 104, the method advances to frame 106. In frame 106, the method includes compressing the gasket loop 10 against channel loop 66 of the first component 62 via second surface 78 of the second component 76. Method 100 concludes in frame 108, with the fluid-pressure joint being fully sealed as the gasket loop 10 is compressed against the channel loop 66, and the first end 30 of the gasket loop first portion 28 is compressed against lead-in chamfer 70. The compression of the gasket loop 10 against channel loop 66 of the first component 62 is typically accomplished via appropriate fasteners, such as screws or bolts, to achieve desired force at the interface between gasket loop 10, and first and second components 62, 76.

Thus assembled, fluid-pressure joint 60 is capable of affecting a robust joint even in the case of large variation of gap 84 that is formed between first and second surfaces 64 and 78. Wherein the stacked-up dimensions of the first and second components 62, 76 are to the high side of tolerance, gap 84 is retained by gasket loop 10 remaining within permissible compression limits, such that the first and second components are not overstressed. On the other hand, wherein the stacked-up dimensions of the first and second components 62, 76 are to the low side of tolerance, gasket loop 10 is compressed sufficiently such that it is stall capable of retaining fluid pressure that is communicated between passages 72 and 80.

While the best modes for carrying out the invention have been described in detail, those familiar with the art to which this invention relates will recognize various alternative designs and embodiments for practicing the invention within the scope of the appended claims.

The invention claimed is:

1. A gasket loop comprising:
   a gasket shape including a first portion characterized by a first cross-sectional view and a discrete number of second portions positioned around the gasket shape, wherein each discrete second portion is characterized by a second cross-sectional view,
   the first portion in the first cross-sectional view having:
      a substantially elongated body characterized by a width and a height;
      a first end characterized by a height, a tip, a width enlarged relative to the width of the body, and a tapered backside, wherein the tapered backside is integral with the body; and
      a distal second end connected to the body; and
   the second portion in the second cross-sectional view having a tip and a height substantially matching those of the first end, and a body that is characterized by a width that is substantially equivalent to the width of the first end.

2. The gasket loop of claim 1, wherein the tip of the first portion in the first cross-sectional view is tapered.

3. The gasket loop of claim 1, wherein the distal second end of the first portion in the first cross-sectional view is substantially spherical.

4. The gasket loop of claim 1, wherein the gasket is formed from a compliant material.

5. The gasket loop of claim 1, wherein the gasket is configured to come into contact with a fluid, and the material is selected based on its chemical resistance to the fluid.

6. The gasket loop of claim 1, wherein the predetermined gasket profile is configured as multiple interconnected O-rings.

7. A fluid-pressure joint assembly comprising:
   a gasket loop having a gasket shape including a first portion characterized by a first cross-sectional view and a discrete number of second portions positioned around the gasket shape, wherein each of the second portions is characterized by a second cross-sectional view, the first portion in the first cross-sectional view having a substantially elongated body characterized by a width and a height, a first end characterized by a height, a tip, a width enlarged relative to the width of the body, a tapered backside, and a distal second end connected to the body, wherein the tapered backside is integral with the body, and the second portion in the second cross-sectional view having a tip and a height substantially matching those of the first end, and a body that is characterized by a width that is substantially equivalent to the width of the first end;
   a first component having a first surface and a channel loop arranged on the first surface to accept the gasket loop, wherein the channel loop is characterized by a channel height, and by a channel profile configured to complement the gasket shape, the channel additionally having a lead-in chamfer configured to complement the tapered backside, and wherein the first component additionally includes a first internal fluid passage having an exit on the first surface, such that exit of the first internal fluid passage is encircled by the channel loop; and
   a second component having a second surface and a second internal fluid passage having an exit on the second surface;
   wherein:
      when the gasket loop is inserted into the channel loop and the first component is assembled with the second component, the second surface is disposed substantially parallel to the first surface, the exit of the second internal fluid passage is encircled by the channel loop, and the second surface of the second component compresses the gasket loop against the first component, such that the height of the body of the first portion is compressed against the channel and the first end of the of the first portion is compressed against the lead-in chamfer to thereby seal the fluid-pressure joint.

8. The fluid-pressure joint assembly of claim 7, wherein the tip of the first portion in the first cross-sectional view is tapered.

9. The fluid-pressure joint assembly of claim 7, wherein the distal second end of the first portion in the first cross-sectional view is substantially spherical.

10. The fluid-pressure joint assembly of claim 7, wherein the gasket is formed from a compliant material.

11. The fluid-pressure joint assembly of claim 7, wherein the gasket is configured to come into contact with a fluid, and the material is selected based on its chemical resistance to the fluid.

12. The fluid-pressure joint assembly of claim 7, wherein the first and second components include multiple corresponding internal fluid passages, each passage of the first component having an exit on the first surface and each passage of the second component having an exit on the second surface, and the gasket shape is configured as multiple interconnected O-rings, such that each exit of the multiple internal fluid passages is encircled by one O-ring of the multiple interconnected O-rings.

13. A method of sealing a fluid-pressure joint comprising:
   inserting a gasket loop having a gasket shape including a first portion characterized by a first cross-sectional view and a discrete number of second portions positioned around the gasket shape, wherein each of the second portions is characterized by a second cross-sectional view, the first portion in the first cross-sectional view having a substantially elongated body characterized by width and a height, a first end characterized by a height, a tip, a width enlarged relative to the width of the body, a tapered backside, wherein the tapered backside is integral with the body, and a distal second end connected to the body, and the second portion in the second cross-sectional view having a tip and a height substantially matching those of the first end, and a body that is characterized by a width that is substantially equivalent to the width of the first end;
   assembling a first component with a second component, the first component having a first surface and a channel loop arranged on the first surface to accept the gasket loop, wherein the channel loop is characterized by a channel height, and by a channel profile configured to complement the gasket shape, the channel additionally having a lead-in chamfer configured to complement the tapered backside, and wherein the first component additionally includes a first internal fluid passage having an exit on the first surface, such that exit of the first internal fluid passage is encircled by the channel loop, the second component having a second surface and a second internal fluid passage having an exit on the second surface, wherein the second surface is disposed substantially parallel to the first surface and the exit of the second internal fluid passage is encircled by the gasket loop; and
   compressing the gasket loop against the first component via the second surface of the second component, such that the height of the body of the first portion is compressed against the channel loop, and the first end of the first portion is compressed against the lead-in chamfer to thereby seal the fluid-pressure joint.

14. The method of sealing a fluid-pressure joint of claim 13, wherein the tip of the first portion in the first cross-sectional view is tapered.

15. The method of sealing a fluid-pressure joint of claim 13, wherein the distal second end of the first portion in the first cross-sectional view is substantially spherical.

16. The method of sealing a fluid-pressure joint of claim 13, wherein the gasket is formed from a compliant material.

17. The method of sealing a fluid-pressure joint of claim 13, wherein the gasket is configured to come into contact with a fluid, and the material is selected based on its chemical resistance to the fluid.

* * * * *